United States Patent Office 3,590,120
Patented June 29, 1971

3,590,120
CHEWING GUM
Joseph C. Muhler, Indianapolis, Ind., assignor to Indiana University Foundation, Bloomington, Ind.
No Drawing. Filed Apr. 16, 1969, Ser. No. 816,773
Int. Cl. A61k 7/16, 9/02
U.S. Cl. 424—48
10 Claims

ABSTRACT OF THE DISCLOSURE

An improved chewing gum comprising an insoluble chewing gum base has incorporated therein a dental plaque removal agent such as sodium bicarbonate (NaHCO$_4$) or the like. In addition, the chewing characteristics, the flavor retention qualities, the dental cleaning and polishing effectiveness of chewing gums may be improved by incorporating therein a dental cleaning and polishing agent comprising a mixture of fine and coarse zirconium silicate particles.

BACKGROUND OF THE INVENTION

Field of the invention

The present invention relates to chewing gum compositions and especially to chewing gum compositions incorporating dental plaque removal agents and dental cleaning and polishing agents comprising mixtures of coarse and fine zirconium silicate particles.

Description of the prior art

Dental research has developed substantial evidence that beyond the age of forty years loss of teeth is predominantly the result of periodontal involvement rather than dental caries. The most important single factor contributing to periodontal disease is the accumulation of plaque and dental calculus (e.g., salivary tartor) on the teeth. These deposits result in tissue inflammation of the surrounding gingiva, and, as the condition increases in severity, the supporting bone is also affected. These reactions lead to the destruction of the supporting structures and the subsequent mass loss of teeth.

Furthermore, available dentifrice abrasives, such as insoluble sodium metaphosphate [(NaPO$_3$)$_x$], calcium hydrogen phosphate dihydrate/anhydrous calcium hydrogen phosphate (CaHPO$_4$·2H$_2$O/CaHPO$_4$); and calcium pyrophosphate (Ca$_2$P$_2$O$_7$), have, when employed in dentifrices, exhibited relatively unsatisfactory enamel polishing qualities and consequently have not been wholly effective in preventing the re-accumulation of materia alba, oral debris, plaque, pellicle, stains, and dental calculus. In particular, while conventional cleaning and polishing agents used with a toothbrush are capable, to varying degrees, of removing materia alba, food particles, exogenous stains, and other tooth surface pigmentations when utilized in ordinary daily brushings, they are generally ineffective in removing the more resistant forms of enamel pigments and usually lack the polishing characteristics necessary to produce a smooth surface that is resistant to plaque and dental calculus reformation. In fact, conventional agents often are quite abrasive to the tooth surfaces and tend to erode the tooth enamel and the surrounding soft dentin areas. This erosion leaves a rough tooth surface that facilitates the re-accumulation of pellicle (the precursor to dental calculus) and plaque (the precursor to dental caries). Furthermore, these conventional dental abrasives leave the teeth aesthetically less desirable than would more effective polishing agents.

Heretofore, chewing gums have not played a significant role in combating the foregoing problems, and this invention therefore has as its primary object the provision of a chewing gum capable of cleaning and polishing oral hard tissues.

Another object is to provide chewing gum compositions comprising in combination with an insoluble gum base unique zirconium silicate (ZrSiO$_4$) dental cleaning and polishing agents in order to clean and polish the teeth.

This invention has for yet another object the provision of new zirconium silicate dental cleaning and polishing agent which may be successfully incorporated in chewing gums.

A further object of the present invention is to provide a method for cleaning the teeth and imparting a high degree of polish thereto, which method comprises regularly chewing a chewing gum composition in which has been incorporated up to about 30% by weight of a unique zirconium silicate dental cleaning and polishing agent produced in accordance with the present invention.

A still further object is to provide a chewing gum composition having improved chewing gum properties and enhanced flavor retention characteristics.

SUMMARY OF THE INVENTION

The foregoing and other objects, advantages, and features of the subject invention may be achieved with chewing gum compositions comprising an insoluble chewing gum base incorporating up to about 5% by weight of a chemical agent (e.g., sodium bicarbonate, NaHCO$_3$; sodium carbonate, Na$_2$CO$_3$; or chloroform, CHCl$_3$) which assists in the removal of dental plaque. Additionally, improved chewing gums have incorporated therein a dental cleaning and polishing agent comprising at least about 20%, by weight of the agent, of fine (i.e., up to about 3 microns particle size) zirconium silicate (ZrSiO$_4$) and between about 5% and about 40% coarse (i.e., about 10–20 microns particle size) zirconium silicate. Preferably a substantial portion of the fine zirconium silicate particles have a relatively smooth surface configuration, while the coarse particles should preferably substantially all have a relatively rough surface configuration. The cleaning and polishing agent is present at a level lying in the range of about 10–150% by weight of the insoluble chewing gum base component of the chewing gum composition.

DESCRIPTION OF THE PREFERRED EMBODIMENTS

In accordance with the present invention, it has been found that an improved chewing gum composition may be obtained by incorporating therein a dental plaque removal agent at a level of up to about 5%, preferably about 1%, by weight of the over-all composition, with an upper concentration limit being imposed by organoleptic, rather than therapeutic, considerations. Suitable agents include sodium bicarbonate (NaHCO$_3$); sodium carbonate (Na$_2$CO$_3$); and organic agents such as chloroform (CHCl$_3$). The agent may be incorporated in the chewing gum in any convenient manner during the manufacture thereof.

The improved chewing gums comprising an insoluble chewing gum base also incorporate a dental cleaning and polishing agent comprising at least about 20%, preferably at least about 50%, fine (i.e., up to about 3 microns particle size) zirconium silicate and about 5%, but no more than about 40%, preferably about 10–20%, coarse (i.e., about 10–20 microns particle size) zirconium silicate. A substantial portion of the fine zirconium silicate particles have a relatively smooth surface configuration, while the coarse particles preferably have a relatively rough surface configuration.

The foregoing dental cleaning and polishing agents are provided at a level of between about 10% and about 150% by weight of the gum base constituent of the overall chewing gum composition (i.e., about a 1:10 to 3:2 agent-gum base weight ratio range). The amount of dental cleaning and polishing agent is expressed in terms of the insoluble chewing gum base component of the composition since the other soluble constituents of the gum are quickly dissolved as the gum is chewed.

Although the principal benefit of adding the fine and coarse zirconium silicate particles to chewing gums is to produce a gum with improved cleaning and polishing characteristics (which will hereinafter be demonstrated), surprising and unexpected effects on flavor retentive qualities and chewing characteristics are also noted in the chewing gums containing these zirconium silicate agents. As will hereinafter be demonstrated, chewing gums of the present invention exhibit a pleasing resiliency and texture not found in conventional chewing gums, and the flavor of these gums lasts a considerably longer period of time than the flavor of conventional gums. Furthermore, these gums do not adhere to false teeth as do conventional gums.

The chewing gums in accordance with the present invention comprise, in addition to the cleaning and polishing component and insoluble gum base, excipients such as corn syrup, and other flavoring and sweetening agents, as well as various inert filler materials. In addition, the gum compositions may further comprise other chemical agents designed to assist in the removal of dental plaque (i.e., sodium bicarbonate [$NaHCO_3$] and the like).

More particularly, the chewing gums of the present invention comprise in the range of about 15–40% gum base. Several formulations are possible, depending upon the type of gum desired (i.e., sugar-containing or sugarless chewing gums, conventional stick gums, or bubble gums). Suitable raw materials for gum bases include chicle, latex, RBH resin, crown gum, Malsa compound PU–C, picolyte resin, candelilla wax, chiquibil gum, and the like.

Conventional chewing gum bases that may be obtained from commercial suppliers are generally suitable, although, as will hereinafter be demonstrated, some bases particularly enhance the cleaning and polishing characteristics of the abrasive-containing gums.

Suitable conventional stick gum bases (i.e., as opposed to bubble gum bases) include "Paloja"; "Firm Paloja"; "Berguna"; and "Dreyco," all available from the L. A. Dreyfus Corporation, P.O. Box 500, South Plainfield, N.J., and "Synthetic Base No. 2939" and "Natural Base No. SC319," which have been obtained from the American Chicle Company, New York, N.Y. Chewing gums employing "Firm Paloja" as a base appear to exhibit superior polishing characteristics, while the gums employing "Berguna" and "Dreyco" have superior cleaning characteristics.

In general, "Firm Paloja," "Synthetic Base No. 2939," "Berguna," and "Dreyco" are preferred chewing gum bases.

Suitable bubble gum bases include: "D.C."; "Extra Soft"; "Oak"; "Grande"; "Soft Ideal"; "Ideal"; "Model;" and "Ladco," all available from the L. A. Dreyfus Corporation. Bubble gums employing 'Oak," "Soft," "Extra Soft," and "D.C." exhibit the best cleaning and polishing characteristics and are considered to be the preferred bubble gum bases.

The excipient constituents of the gum may include any of the convention flavoring and sweetening components to a level in the range of about 40–70% by weight. Flavors such as spearmint, peppermint, wintergreen, fruit flavors, and the like may be used. The preferred gum compositions employ sorbitol and synthetic sweetening agents such as sodium and calcium cyclamates and saccharines rather than corn syrup and sugar, because of the cariogenic potential of natural sweeteners. When sodium cyclamate is used, a small quantity of salt (i.e., sodium chloride) is generally included with the sweetening agents. Of course, natural sweeteners may be employed, but if they are, it is preferred that the chewing gum also include an effective amount of anticariogenic agent, such as monosodium dihydrogen phosphate ($NaH_2PO_4$), as set forth and described in applicant's co-pending United States patent application, Ser. No. 702,544; filed Feb. 2, 1968, now Pat. No. 3,467,529. Indeed, such agents as $NaH_2PO_4$ may be employed advantageously in comestibles such as chewing gums whether or not they contain sugars.

Inert filling ingredients, such as Mannitol, glycerin, lecithin, or the like are provided in order to contribute to the over-all consistency of the composition.

The foregoing gum bases, excipients, and fillers are all known chewing gum constituents, and are provided at conventional levels, and therefore per se form no part of the present invention.

The size of particles in cleaning and polishing compositions can be expressed in a number of ways, one of the most common of which is "mean diameter" i.e., the average diameter of a particle (as determined by appropriate measurement such as by a floatation process, by electron diffraction comparison with known styrene balls, or by light microscopy techniques), with the number of such particles in each given diameter range being expressed on a weight percentage basis. As hereinafter utilized, the term "particle size" refers to such a mean diameter value.

Zirconium silicate is a well-known industrial abrasive which is used for the grinding and polishing of glass and ceramics; however, prior to the subject invention, this material had not been proposed for use as a cleaning and polishing component of a chewing gum composition. The extreme hardness and the abrasion characteristics exhibited by zirconium silicate (e.g., a hardness number of 7.5 on the Mohs scale for commercially available zirconium silicate, such as types used for grinding of glass) would suggest to one skilled in the art that zirconium silicate would seriously damage (i.e., abrade and scratch) tooth structure and would thus be unsuitable for use on the teeth.

Nonetheless, in accordance with the subject invention, it has been found that zirconium silicate, in various ranges of particle sizes produced by different milling techniques, possess superior cleaning qualities and yet is less abrasive and is a much better polishing agent than other existing dental abrasive compounds. Indeed, the gums of the present invention are significantly less abrasive than commonly used dentifrices and are not significantly more abrasive than gums not containing abrasive.

The preparation of suitable particle size zirconium silicate particles can be accomplished by conventional techniques well known to the art. Basically, these techniques involve milling zirconium silicate ore (zircon), followed by standard screen sieving (or air separation) to segregate the desired particle sizes. Various milling techniques, such as hammer milling or ball milling, may be utilized in order to obtain the desired surface configurations for the zirconium silicate particles.

As is well known to the art, hammer mills utilize a high speed rotary shaft having a plurality of hammers or beaters mounted thereon. The hammers may be T-shaped elements, bars, or rings fixed or pivoted to the shaft or to discs pivoted to the shaft. The shaft runs in a housing containing grinding plates or liners. The grinding action results from the impact between the material being milled and the moving hammers. When zircon ore is milled by an attrition technique such as hammer milling, relatively rough, jagged particles are produced.

Similarly, a ball mill comprises a cylindrical or conical shell rotating on a horizontal axis which is charged with a grinding medium such as balls of steel, flint, or porcelain. The grinding is accomplished by the tumbling action of the balls on the material to be ground. Particles of zirconium silicate treated in a ball mill of the character described have relatively smooth surface configurations.

As previously noted, the dental cleaning and polishing agents employed in accordance with the present invention comprise at least about 20% and preferably at least about 50% fine (i.e., up to about 3 microns particle size) zirconium silicate and about 5–40%, preferably about 10–20%, coarse (i.e., between about 10–20 microns particle size) zirconium silicate. Preferably at least half, and advantageously all of the fine zirconium silicate particles have a relatively smooth surface configuration while all of the coarse zirconium silicate particles preferably have a relatively rough surface configuration.

In addition to the foregoing coarse and fine zirconium silicate constituents, the cleaning and polishing agents of the present invention may include zirconium silicate particles lying in ranges outside the indicated fine and coarse levels (i.e., in the range of 3–10 microns) or in the range of in excess of 20 microns, although it is important that the number of particles in excess of 20 microns be minimized in order to avoid a "grittiness" of the end product. Furthermore, the agents may comprise other dental cleaning and polishing agents in addition to zirconium silicate so long as the indicated amounts and proportions of fine and coarse zirconium silicate particles are provided. Possible other agents include calcium pyrophosphate ($Ca_2P_2O_7$); calcium hydrogen phosphate dihydrate ($CaHPO_4 \cdot 2H_2O$); anhydrous calcium hydrogen phosphate ($CaHPO_4$); insoluble sodium metaphosphate [$(NaPO_3)_x$]; calcium carbonates ($CaCO_3$); talcs $$[Mg_3Si_4O_{10}(OH)_2];$$

and other mineral materials such as olivine $$[2(Mg,Fe)O \cdot SiO_2);$$

tremolite [$CaMg_3(SiO_3)_4$]; kaolonite $$Al_2O_3 \cdot 2 \pm SiO_2 \cdot 2H_2O)$$

microline ($KalSi_3O_8$); albite ($NaAlSi_3O_8$); and chromite ($FeO \cdot Cr_2O_3$). However, in all cases, the benefits of the present invention appear to be substantially provided by the indicated fine/coarse zirconium silicate particle mixtures.

The following examples give particle size distributions for two exemplary dental cleaning and polishing agents in accordance with the present invention. The first distribution represents the preferred zirconium silicate in accordance with the present invention and it is referred to hereinafter as $ZrSiO_4$ "P," and the second distribution, $ZrSiO_4$ "I," represents another formulation in accordance with the present invention.

EXAMPLE I

| Particle size ($\mu$): | Surface configuration | Weight (percent) |
|---|---|---|
| 0–3 | Smooth | 65 |
| 3–5 | Rough | 10 |
| 5–10 | do | 10 |
| 10–20 | do | 15 |
| >20 | do | 0 |

EXAMPLE II

| Particle size ($\mu$): | Surface configuration | Weight (percent) |
|---|---|---|
| 0–3 | Rough | 20 |
| 3–5 | do | 50 |
| 5–10 | do | 25 |
| 10–20 | do | 5 |
| >20 | do | 0 |

The cleaning and polishing agents of the present invention are employed in the chewing gum preparations within the range of up to about 150% by weight of the gum base, depending upon the particular formulation desired. While there is no operative minimum level, in general, better results are achieved with increasing levels of cleaning and polishing agents. Thus, it is recommended that the chewing gums comprise at least about 10% and preferably about 75–125% of the cleaning and polishing component by weight of the gum base. In fact, the previously noted upper limitation (i.e., about 150% by weight) is imposed not by reason of its effect on cleaning and polishing, but by reason of the effect on the chewing qualities and related characteristics of the resulting gum composition (i.e., a "gritty" sensation is produced above the level). Expressed in terms of weight ratio ranges, the compositions comprise cleaning and polishing agents in a ratio of up to a maximum of a 3:2 agent-gum base ratio. Preferably, the ratio is at least about 1:10, with best results being obtained with a ratio lying in a 3:4 to 4:3 weight ratio range.

An exemplary method of formulating a chewing gum in accordance with this invention is as follows.

EXAMPLE III

Twenty-five grams of gum base and 28 grams of corn syrup are combined in a vessel and slowly warmed with stirring to approximately 175° F. mannitol (41.9 grams), sodium saccharine (0.1 gram), and zirconium silicate (10 grams, $ZrSiO_4$ I) are then blended with vigorous stirring. Flavoring agent (e.g., 1.0 ml. spearmint oil) is then added with continued stirring for approximately 5 to 10 minutes. The mixture is then cooled for two minutes. The gum mixture is then shaped into the desired form such as stick form, and the surface may be coated with mannitol.

Compositions of other exemplary chewing gums produced in accordance with the present invention are given in the following examples.

EXAMPLE IV

Sugar-containing chewing gum

| Constituent: | Parts by weight | |
|---|---|---|
| Chewing gum base | 18.0 | 24.0 |
| Corn syrup | 27.7 | 25.7 |
| Mannitol | 42.0 | 28.0 |
| Flavoring (spearmint) | 0.6 | 0.6 |
| Sweetening (saccharine sodium) | 0.1 | 0.1 |
| Zirconium silicate I | 10.0 | 20.0 |
| Water | 0.3 | 0.3 |
| Glycerine | 0.3 | 0.3 |
| Sodium bicarbonate ($NaHCO_3$) | 1.0 | 1.0 |

EXAMPLE V

Sugarless chewing gum

| Constituent: | Parts by weight |
|---|---|
| Chewing gum base | 20.0 |
| Mannitol | 25.0 |
| Sorbitol | 20.8 |
| Glycerine | 1.7 |
| Zirconium silicate P | 30.0 |
| Sodium bicarbonate ($NaHCO_3$) | 1.0 |
| Sweeteners | 0.5 |
| Saccharine sodium | 0.06 |
| Sodium chloride | 0.17 |
| Sodium cyclamate | 0.27 |
| Flavoring (mixed fruit) | 1.0 |

EXAMPLE VI

Sugarless bubble gum

| Constituent: | Parts by weight |
|---|---|
| Bubble gum base | 25.0 |
| Mannitol | 35.9 |
| Sorbitol | 20.0 |
| Glycerine | 1.6 |
| Zirconium silicate P | 15.0 |
| Sweeteners | 0.5 |
| Saccharine sodium | 0.06 |
| Sodium chloride | 0.17 |
| Sodium cyclamate | 0.27 |
| Sodium bicarbonate ($NaHCO_3$) | 1.0 |
| Spearmint oil | 0.9 |
| Peppermint oil | 0.1 |

EXAMPLE VII

Sugar-containing bubble gum

| Constituent: | Weight percent |
|---|---|
| Bubble gum base | 19.3 |
| Mannitol | 39.0 |
| Corn syrup | 29.0 |
| ZrSiO$_4$ P | 10.0 |
| Sodium bicarbonate (NaHCO$_3$) | 1.0 |
| Flavor (peppermint) | 1.0 |
| Saccharine sodium | 0.1 |
| Glycerine | 0.3 |
| Water | 0.3 |

Of course, each of the foregoing examples could be modified by using zirconium silicate agents other than ZrSiO$_4$ P and I. Also, the cleaning and polishing agent may be added substantially at any stage of the manufacture of the chewing gum.

EXPERIMENTAL EVALUATIONS

The superiority of the abrasive-containing chewing gum of the present invention has been demonstrated by in vitro studies which evaluated the cleaning and polishing characteristics of chewing gum bases containing different dental abrasive materials at various concentration levels and by a human clinical study which evaluated the flavor retention properties of chewing gums containing zirconium silicate.

In vitro polishing and cleaning evaluations

A definitive laboratory test procedure has been developed in order to evaluate the cleaning properties of the subject abrasive-containing chewing gums. This procedure (as set forth and described in Cooley et al. U.S. Pat. No. 3,151,027) involves the use of polyester plastic blocks specifically designed for use in an electrical toothbrushing machine. The blocks are ground smooth, washed, dried, and a thin coating of black lacquer (previously observed to simulate dental pellicle) is carefully applied to the surface of the block. The blocks are then inserted in a "toothbrushing machine" (i.e., a machine having a reciprocable arm that is capable of holding and rubbing an abrasive-containing material over the surface of the polyester plastic blocks at a fixed speed with a fixed pressure) and rubbed with the abrasive-containing chewing gums for 100 double strokes.

The amount of lacquer removed by the rubbing procedure is determined by means of a reflectometer especially adapted for that purpose. A beam of polarized light is reflected from the lacquered surface and the reflected beam is received by a photoelectric cell, which in turn activates a galvanometer. The removal of lacquer from the surface of the polyester plastic block decreases the amount of light reflected from the surface of the block and the amount of light received by the photoelectric cell; this in turn is registered as a change in voltage on the galvanometer. In the case of a cleaning agent, the cleaning ability of the agent is measured by the mean decrement in the galvanometer reading after the block has been rubbed by the abrasive, with a higher value indicating greater lacquer removal and hence a greater cleaning ability.

Enamel polishing values have also been obtained for the same materials in accordance with the following general procedure. Under this method, the lingual surfaces of freshly extracted maxillary anterior teeth are reduced with the aid of a diamond disc, and the teeth are mounted by means of a low melting alloy, such as Wood's metal, on hexagonal jigs, constructed so as to fit the movable state of a reflectometer. The exposed labial surface of each tooth is mounted in such a manner that the height of the contour is a suitable distance above the base of the jig. Throughout the procedure, care is taken to insure that the teeth do not become dry in order to prevent damage of the tooth tissues. The exposed enamel surface is then dulled by exposing it to a 0.10% hydrochloric acid solution (pH 2.2) for 30 seconds. Any acid remaining on the tooth surface is neutralized immediately by transferring the tooth to a saturated sodium carbonate solution for 30 seconds. The tooth is then rinsed with water and blotted dry.

The maximum reflectance of the tooth surface is determined by means of the same type of reflectometer described above, but the polishing action results in an incremental reading, whereas the cleaning action results in a decremental reading (i.e., the smoother the enamel surface, the smaller the amount of diffused and scattered light, and, hence, the higher the galvanometer reading). In measuring the polishing ability of the abrasive-containing chewing gum, the maximum reflectance of the dull tooth is first determined; then the tooth is polished with the chosen abrasive-containing chewing gum in an automatic toothbrushing machine for 100 double strokes. After the tooth has been polished, the enamel surface is rinsed with water to remove any residual particles of the cleaning and polishing agent and the reflectance of the enamel surface is again measured with the tooth located in exactly the same position as it occupied for the "dull" reading. The increase in the amount of reflectance between the dulled and polished enamel surfaces is taken as a measure of the degree of polishing imparted by the abrasive treatment.

In both the cleaning and polishing evaluations of the abrasive-containing chewing gums, the gum samples to be tested on the toothbrush machine are chewed for ten minutes before being mounted on the machine.

Laboratory studies were conducted in accordance with the foregoing procedures in order to determine the relative cleaning and polishing effectiveness of various cleaning and polishing agents when incorporated into two different chewing gum formulations, namely, sugarless chewing gum and sugarless bubble gum. Only one basic chewing gum formula was employed for each type of gum, and each agent was added at the 10.0% level, so that the only variable was the type of cleaning and polishing agent used.

The results of these studies, presented in Table I (sugarless chewing gum) and Table II (sugarless bubble gum) show that of all of the agents evaluated the ZrSiO$_4$ I of the present invention produced the greatest cleaning and polishing effects in gum products by a substantial margin.

TABLE I

Cleaning and Polishing Effects of Different Abrasives Incorporated in a Sugarless Chewing Gum

| Cleaning and polishing agent | Polishing score (mean increment) | Cleaning score (mean decrement) |
|---|---|---|
| Al$_2$O$_3$ (kappa alumina) | 0.70 | 0.20 |
| Ca$_2$P$_2$O$_7$ | 0.98 | 0.90 |
| CaHPO$_4$.2H$_2$O+CaHPO$_4$ (1:1) | 0.65 | 0.45 |
| Mg$_3$Si$_4$O$_{10}$(OH)$_2$+ZrSiO$_4$* (3:1) | 1.30 | 0.90 |
| CaCO$_3$ | 1.52 | 1.10 |
| Mg$_3$Si$_4$O$_{10}$ | 0.90 | 0.45 |
| ZrSiO$_4$* | 1.85 | 0.30 |
| ZrSiO$_4$ I | 2.28 | 1.70 |

*A zirconium silicate sample comprising all smooth surface particles under 8 microns particle size (i.e., without the coarse ZrSiO$_4$ particles required by the present invention).

TABLE II

Cleaning and Polishing Effects of Different Abrasives Incorporated in a Sugarless Bubble Gum

| Cleaning and polishing agent | Polishing score (mean increment) | Cleaning score (mean decrement) |
|---|---|---|
| Al$_2$O$_3$ (kappa alumina) | 1.65 | 4.00 |
| Ca$_2$P$_2$O$_7$ | 0.85 | 3.25 |
| CaHPO$_4$.2H$_2$O+CaHPO$_4$ (1:1) | 1.58 | 4.50 |
| Mg$_3$Si$_4$O$_{10}$(OH)$_2$+ZrSiO$_4$* (3:1) | 1.55 | 2.81 |
| CaCO$_3$ | 1.20 | 7.50 |
| Mg$_3$Si$_4$O$_{10}$(OH)$_2$ | 0.73 | 5.40 |
| ZrSiO$_4$* | 1.90 | 2.30 |
| ZrSiO$_4$ I | 1.53 | 4.55 |

*A zirconium silicate sample comprising all smooth surface particles under 8 microns particle size (i.e., without the coarse ZrSiO$_4$ particles required by the present invention).

Cleaning and polishing studies have also been conducted in order to determine the effect of the type of chewing gum base selected on the cleaning and polishing characteristics of the chewing gum product, and these data, which are given in Table III, show the cleaning and polishing properties of sugarless chewing gums employing a variety of different kinds of commercially available chewing gum bases containing $ZrSiO_4$ I and another $ZrSiO_4$ sample which did not include the coarse $ZrSiO_4$ particles. These data show that all chewing gum bases containing $ZrSiO_4$ I produced significant cleaning and polishing effects. The data also show that the choice of chewing gum base affects the cleaning and polishing properties of the gum, with the "Berguna" and "Dreyco" brands producing a gum with superior cleaning qualities and the "Firm Paloja" and "Synthetic Base No. 2939" brands producing a gum with superior polishing characteristics.

TABLE III

Effects of Different Gum Bases on the Cleaning and Polishing Characteristics of Sugarless Chewing Gum

| Chewing gum base | Cleaning and polishing agent | Polishing score (mean increment) | Cleaning score (mean decrement) |
| --- | --- | --- | --- |
| Paloja [1] | $ZrSiO_4$ [2] | 0.88 | 2.90 |
|  | $ZrSiO_4$ I | 1.95 | 3.90 |
| Firm Paloja [1] | $ZrSiO_4$ [2] | 1.83 | 3.60 |
|  | $ZrSiO_4$ I | 2.18 | 3.80 |
| Synthetic base No. 2939 [3] | $ZrSiO_4$ [2] | 1.95 | 4.15 |
|  | $ZrSiO_4$ I | 2.58 | 4.35 |
| Natural base No. SC319 [3] | $ZrSiO_4$ [2] | 1.58 | 1.60 |
|  | $ZrSiO_4$ I | 1.56 | 3.40 |
| Berguna [1] | $ZrSiO_4$ [2] | 1.75 | 4.50 |
|  | $ZrSiO_4$ I | 1.55 | 7.25 |
| Dreyco [1] | $ZrSiO_4$ [2] | 1.10 | 7.05 |
|  | $ZrSiO_4$ I | 1.25 | 6.95 |

[1] Gum bases available commercially from the L. A. Dreyfus Corporation, Box 500, South Plainfield, N. J.
[2] A zirconium silicate sample comprising all smooth surface particles under 8 microns particle size (i.e., without the coarse $ZrSiO_4$ particles required by the present invention).
[3] Gum bases obtained from the American Chicle Company, New York, N.Y.

Comparative data showing cleaning and polishing effects of different concentrations of cleaning and polishing agents incorporated in chewing gums are given in Tables IV (Sugarless Bubble Gum) and V (Sugar-Containing Chewing Gum). These data suggest that effectiveness generally increases with increasing concentration of cleaning and polishing agent. However, as previously noted, the maximum agent level in accordance with the present invention is determined by considerations other than cleaning and polishing effectiveness.

TABLE IV

Cleaning and Polishing Effects of Different Concentrations of Zirconium Silicate I Incorporated Into a Sugarless Bubble Gum

| $ZrSiO_4$ I concentration (percent) [1] | Polishing score (mean increment) | Cleaning score (mean decrement) |
| --- | --- | --- |
| 0 | 0.68 | 5.90 |
| 8 | 1.10 | 4.55 |
| 10 | 1.53 | 4.55 |
| 12 | 1.28 | 6.80 |
| 20 | 2.38 | 6.45 |

[1] By weight of overall gum.

TABLE V

Cleaning and Polishing Effects of Different Concentrations of Zirconium Silicate I Incorporated Into a Sugar-Containing Chewing Gum

| $ZrSiO_4$ I concentration (percent) [1] | Polishing score (mean increment) | Cleaning score (mean decrement) |
| --- | --- | --- |
| 10 | 3.30 | 4.45 |
| 20 | 3.75 | 5.80 |
| 25 | 4.40 | 6.85 |

[1] By weight of the chewing gum.

Clinical flavor retention evaluations

In addition to the efficacy of the subject chewing gums in cleaning and polishing the teeth, the addition of the cleaning and polishing agents of the present invention to the gums also serves to enhance the flavor retention characteristics of the gum, as established by the clinical data reported in Table VI.

In this study, the indicated gums were first coded to insure a blind study and were then provided to young adults, who were instructed to chew the gum until the flavor had decreased to a constant level (representing approximately a 90% loss of flavor). The time required for each subject was then recorded and averaged with the recorded times for all other subjects chewing the same product. The averaged data in Table VI indicate that the chewing gums containing zirconium silicate I retained their flavor 38.9% longer than commercially available gums without zirconium silicate and more than 30% longer than the same gum without zirconium silicate.

Upon further questioning, the subjects provided with the abrasive-containing chewing gums also reported that the chewing gums exhibited a pleasing resiliency and texture that was not present in the control gum, the other commercial gums tested, or in other commercial gums that the subjects had used previously. Thus, another quality of chewing gums—resiliency and texture—is enhanced by the incorporation of dental cleaning and polishing agents therein in accordance with the present invention.

TABLE VI

Effect of zirconium silicate upon flavor retention in chewing gum

| Chewing gum: | Time required to lose 90% of flavor upon chewing (minutes) |
| --- | --- |
| Commercial gum | 4.50 |
| Control gum (no $ZrSiO_4$) | 4.75 |
| Experimental gum (with $ZrSiO_4$ I) | 6.25 |

From the foregoing, it can be seen that the chewing gum compositions of the present invention have improved taste retention and chewing qualities and provide a substantial advance in dental health. The use of such compositions permits one, by simply chewing gum, to remove and inhibit the reformation of dental plaque, pellicle, and calculus. As a result, dental caries may be minimized, as can periodontal involvement. The chewing gums clean and polish in their own right and further serve, in combination with other recommended oral hygiene techniques (e.g., daily toothbrushing and periodic professionally administered or supervised prophylaxis treatments), to enhance the over-all oral health of the user.

I claim:

1. A chewing gum comprising a chewing gum base and a dental cleaning and polishing agent comprising about 20–70%, by weight of the agent, fine zirconium silicate, $ZrSiO_4$, particles lying in the range of up to about 5 microns and about 5–40%, by weight of the agent, coarse zirconium silicate, $ZrSiO_4$, particles lying in the range of about 5–20 microns, the agent being present in the gum at a level such that the weight ratio of agent to gum base lies in the range of about 1:10–3:2.

2. A chewing gum, as claimed in claim 1, wherein the weight ratio of agent to gum base lies in the range of about 3:4–4:3.

3. A chewing gum, as claimed in claim 1, wherein the fine zirconium silicate particles lie in the range of up to about 3 microns.

4. A chewing gum, as claimed in claim 3, wherein the agent comprises at least about 50% fine zirconium silicate particles by weight of the agent.

5. A chewing gum, as claimed in claim 1, and further comprising about 1–5%, by weight of the chewing gum, of a dental plaque removal agent selected from the group consisting of sodium bicarbonate, $NaHCO_3$; sodium carbonate, $Na_2CO_3$; chloroform, $CHCl_3$; and mixtures thereof.

6. A chewing gum, as claimed in claim 5, wherein the member is sodium bicarbonate, $NaHCO_3$.

7. A chewing gum, as claimed in claim 6, wherein the coarse zirconium silicate particles lie in the range of about 10–20 microns.

8. A chewing gum, as claimed in claim 7, wherein the agent comprises about 10–20% coarse zirconium silicate particles by weight of the agent.

9. A method for cleaning and polishing teeth and removing and inhibiting the reformation of dental plaque, pellicle, and calculus comprising regularly chewing a chewing gum comprising a dental cleaning and polishing agent comprising about 20–70%, by weight of the agent, fine zirconium silicate, $ZrSiO_4$, particles lying in the range of up to about 5 microns, and about 5–40%, by weight of the agent, coarse zirconium silicate, $ZrSiO_4$, particles lying in the range of about 5–20 microns, the agent being present in the gum at a level such that the weight ratio of agent to chewing gum base lies in the range of about 1:10–3:2.

10. A method, as claimed in claim 9, wherein the chewing gum further comprises about 1–5%, by weight of the chewing gum, of a dental plaque removal agent selected from the group consisting of sodium bicarbonate, $NaHCO_3$; sodium carbonate, $Na_2CO_3$; chloroform, $CHCl_3$; and mixtures thereof.

References Cited

UNITED STATES PATENTS

| | | | |
|---|---|---|---|
| 1,171,392 | 2/1916 | Meier | 424—48 |
| 2,128,917 | 9/1938 | Crocker | 424—49 |
| 3,450,813 | 6/1969 | Muhler | 424—49 |

OTHER REFERENCES

Dental Abstracts, Vol. 9, pp. 56 and 57, January 1964.

RICHARD L. HUFF, Primary Examiner

U.S. Cl. X.R.

424—49